(12) United States Patent
Yim et al.

(10) Patent No.: US 8,174,374 B2
(45) Date of Patent: May 8, 2012

(54) METHOD AND SYSTEM FOR CODING DIGITAL INFORMATION IN LANE MARKINGS USING AN OPTICAL SENSOR

(75) Inventors: Raymond Yim, Cambridge, MA (US); Masashi Saito, Newton, MA (US); Fatih M. Porikli, Watertown, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 471 days.

(21) Appl. No.: 12/495,419

(22) Filed: Jun. 30, 2009

(65) Prior Publication Data
US 2010/0328054 A1 Dec. 30, 2010

(51) Int. Cl.
*G08B 21/00* (2006.01)
(52) U.S. Cl. ............ 340/425.5; 340/438; 340/905; 348/118; 701/400; 404/9

(58) Field of Classification Search ........... 340/425.5, 340/435, 438, 905; 348/118, 119; 382/294; 701/23, 200; 404/9
See application file for complete search history.

(56) References Cited

U.S. PATENT DOCUMENTS

| 7,140,803 | B2 | 11/2006 | Cummings |
| 7,421,095 | B2 | 9/2008 | Ikeda |
| 2006/0132295 | A1 | 6/2006 | Gern |
| 2006/0177265 | A1 | 8/2006 | Cummings |
| 2007/0198146 | A1 | 8/2007 | Ikeda |
| 2007/0225913 | A1 | 9/2007 | Ikeda |
| 2008/0255724 | A1 | 10/2008 | Fechner |

*Primary Examiner* — Jeffery Hofsass
(74) *Attorney, Agent, or Firm* — Dirk Brinkman; Gene Vinokur

(57) ABSTRACT

A road surface includes lane marking that store digital information. Images of the road surface and lane markings are acquired by a camera. The digital information is decoded from the images, analyzed so that a feedback signal can be generated according to the decoded digital information.

19 Claims, 6 Drawing Sheets

METHOD AND SYSTEM FOR CODING DIGITAL INFORMATION IN LANE MARKINGS USING AN OPTICAL SENSOR

FIELD OF THE INVENTION

This invention relates generally to lane markings on roads, and more particularly to coding digital information in lane markings.

BACKGROUND OF THE INVENTION

Different colors, lengths, and of lane markings guide users of roads, e.g., drivers and pedestrians. When a vehicle is equipped with a camera and processor, the markings can be analyzed using computer vision techniques, U.S. patents and Publications: U.S. Pat. Nos. 7,421,095, 7,421,095, 7,140,803, 2008-0255724, 2007-0225913, and 2007-0198146, 2006-0177265, and 2006-0132295.

SUMMARY OF THE INVENTION

The embodiments of the invention provide a method and system for coding (encoding and decoding) digital information in lane markings.

DETAILED DESCRIPTION OF THE PREFERRED EMBODIMENT

Figure 1A:
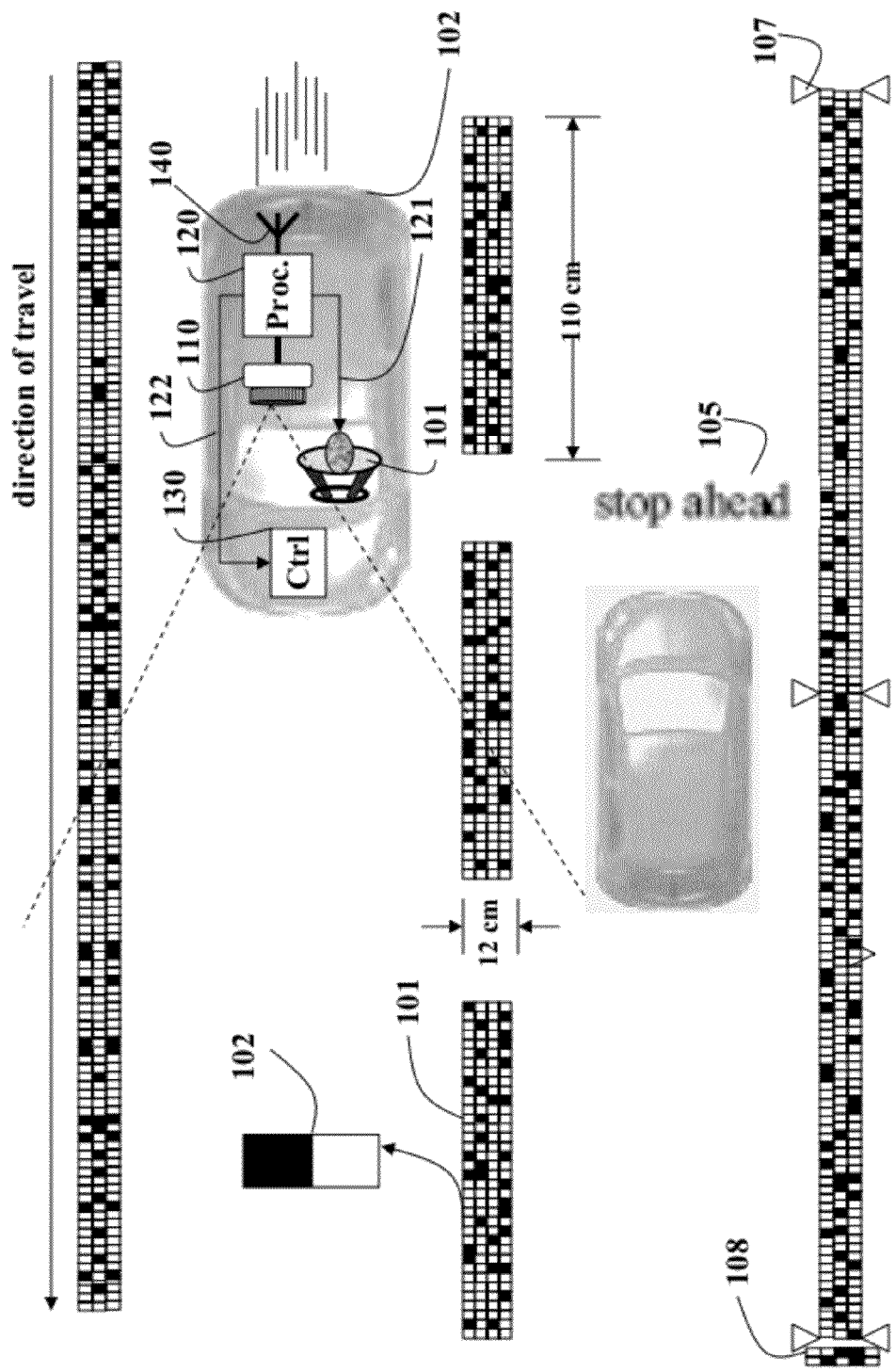
FIG. 1A is a schematic of a system for coding lane markings according to embodiments of the invention.
Figure 1B:
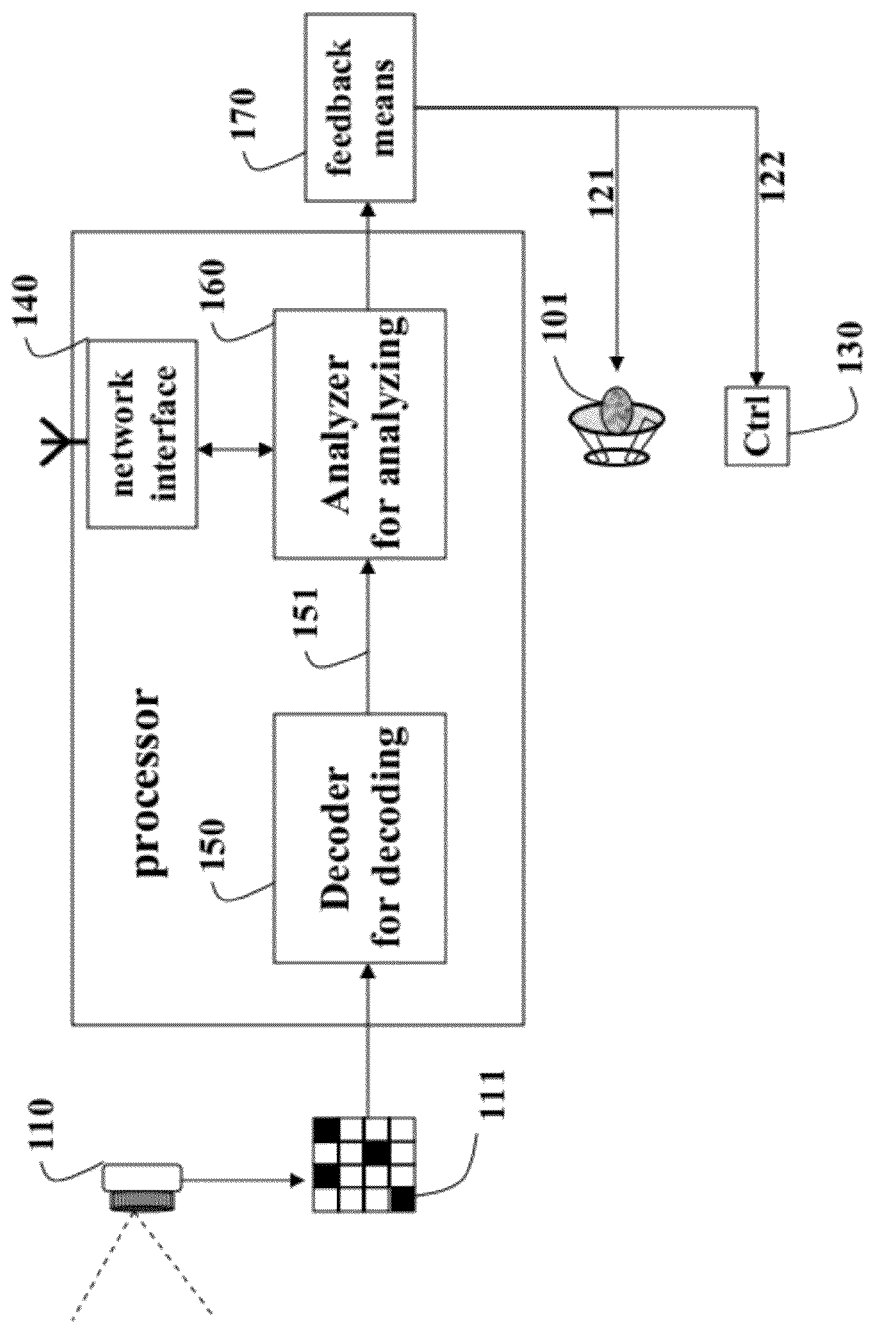
FIG. 1B is a schematic of a system for coding lane markings according to embodiments of the invention.

FIGS. 1A-1B shows a system and method for coding digital information 102 stored in lane markings 101. By coding, we mean encoding and decoding. The markings as described herein can be in the visible portion of the spectrum or infrared, including near and far (thermal) infrared bands. The encoded digital information is embedded in a substrate, e.g., the road surface, similar to the way that digital information is stored in the substrate of compact discs (CD) by physically altering the substrate. The digital information can be rewritten by repainting as the associated information changes over time. Hence, the road surface and markings can be considered a read/write memory for storing the encoded digital information. Normal paint or near infrared reflector paint and materials, as well as other paints and materials that have different emissivity can be used to embed the digital information into the substrate. An infrared source illuminating the road markings may be used to improve the visibility of the infrared camera.

Digital information on a CD is read by an optical sensor. Likewise, we use an optical sensor 110, e.g., a camera. The scene can be illuminated from ambient light from the sun or street lights. The vehicle can also illuminate the road marking using a visible or infrared light source. The camera can be for visible or infrared light. The output of the camera is connected to a processor 120 for performing the steps of the method as shown in FIG. 1B.

The camera acquires images 111. The digital information in the images is decoded 150 to produce decoded digital information 151. The decoded digital information is analyzed 160 to generate 170 feedback signals 122 to a user 101 of the road, or a controller 130 used during operation of the vehicle 102. The decoding can use a likelihood function.

Encoding Digital Information in Lane Markings

The following constraints are observed for the encoding of digital information. First, the lane marking should be unobtrusive even when storing the digital information. To resist wear and tear, the digital information includes error correcting codes (ECC).

One standardized code that can be used is a QR code. The QR code is a two-dimensional matrix code where the white and black colors of the digital information represent 0 and 1 bits. The QR code can be used with the Reed Solomon ECC. QR codes are used in numerous commercial tracking applications, and convenience-oriented applications aimed at mobile users. The QR code can store addresses and Uniform Resource Locators (URLs). Cameras equipped with the appropriate reader software can scan the image 111 of the QR code and launch a browser. The act of linking from physical world objects, e.g., lane markings, is known as a hardlink or physical world hyperlinks.

As another advantage, QR codes can incorporate eye-catching images or characters 105 as a visual aid to the user.

Another possible encoding is the public domain PDF417 code, which is a stacked linearbar code. Open Source decoders are readily available and can be user modified.

If a resolution of the camera is 640×480 pixels, then a typical portion of the marking near the camera covers 16×144 pixels. Each bit should cover about 2×2 pixels. To ensure visibility to human, we enforce the ratio of white and black modules to at least 2 to 1.

Therefore, a typical lane marking is about 12 cm wide, and 110 cm long. Three consecutive bits are combined into a group such that each group contains at least two white bits to obey the above stated constraint. Therefore, each group can store one of four possible symbols (WWW, BWW, WBW, WWB). Thus, a marking can store 48 symbols, or 96 bits of information without the ECC. If the ECC is ⅓, then the marking can store 32 bits.

To encode the 32 information bits to store in a lane marking, we first apply a rate ⅓ ECC to obtain 96 bits. Then, every two consecutive bits are combined to form 48 symbols. An interleaver can be used to scramble the 48 symbols, and the 48 interleaved symbols are mapped sequentially to each group.

Because the camera is elevated above the substrate, the relative length between the length and the width of the lane marking is smaller than in reality. Hence, the bits can be elongated to 6 cm×3 cm. This decreases the total number of information bits in a lane marking, but ensures sufficient resolution for lane marking that is about 2 meters away from the camera. Other size variations are possible, for example, lane markings 105 that are orthogonal to the direction of travel.

To help identify starting and ending location of a lane marking, additional marks 107 and preambles 108 can delineate the digital information.

Encoding with Bott's Dots

Figure 2:
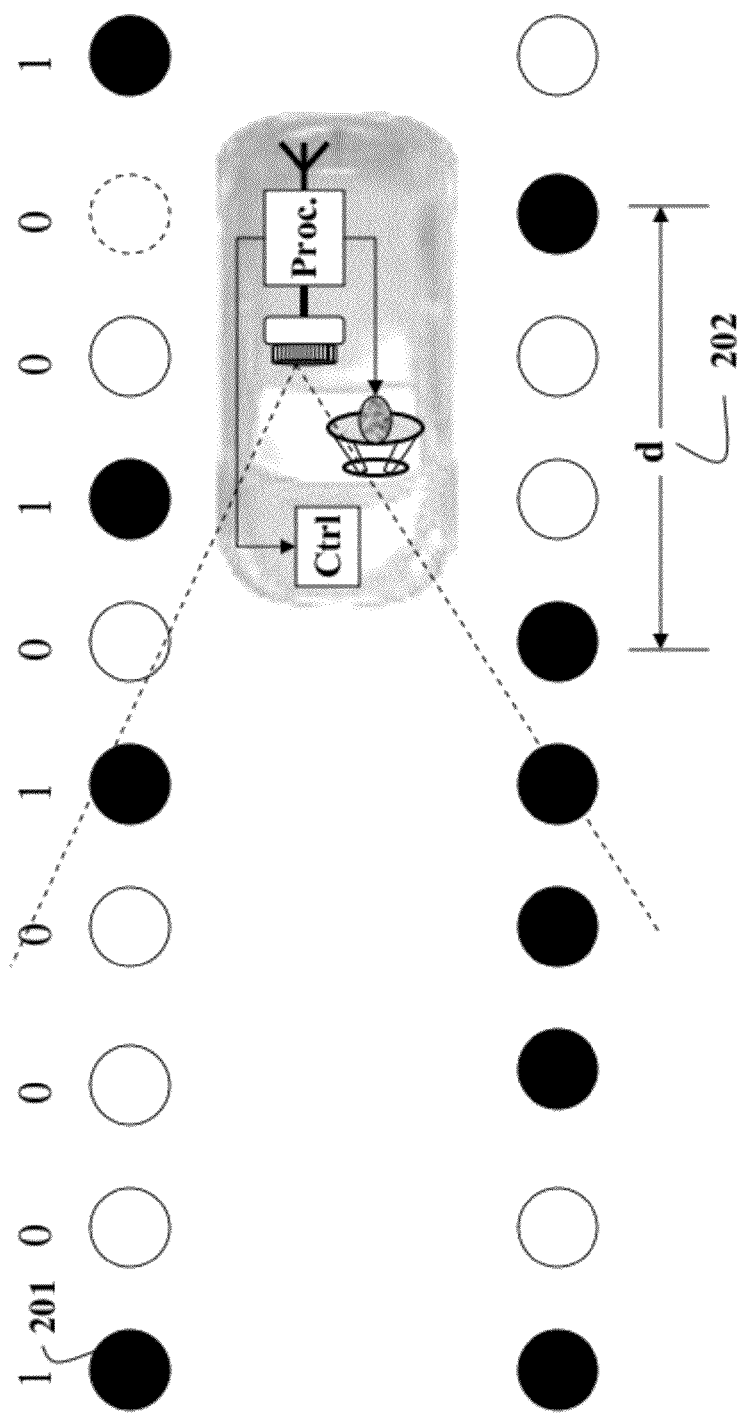
FIG. 2 is a schematic of encoded digital information using Bott's dots according to embodiments of the invention.

As shown in FIG. 2, Botts' dots 201 are round raised lane markers that provide tactile feedback to drivers when the vehicle crosses the marking. Botts' dots can be various colors. The distance 202 between two consecutive Bott's dots typically does not exceed 2 meters. To ensure readability of the digital information, we set the distance between the Bott's dots to be multiple of 10 cm. The presence of a Bott's dot represents the 1 bit, and the absence a o bit. If the digital data contain more than 19 consecutive zeros, a Bott's dot is inserted without carrying any information. This ensures that spacing between the Bott's dots does not exceed 200 cm. For a field of view of 20 m, at least 190 bits of information can be communicated, when no ECC is used.

Figure 3:
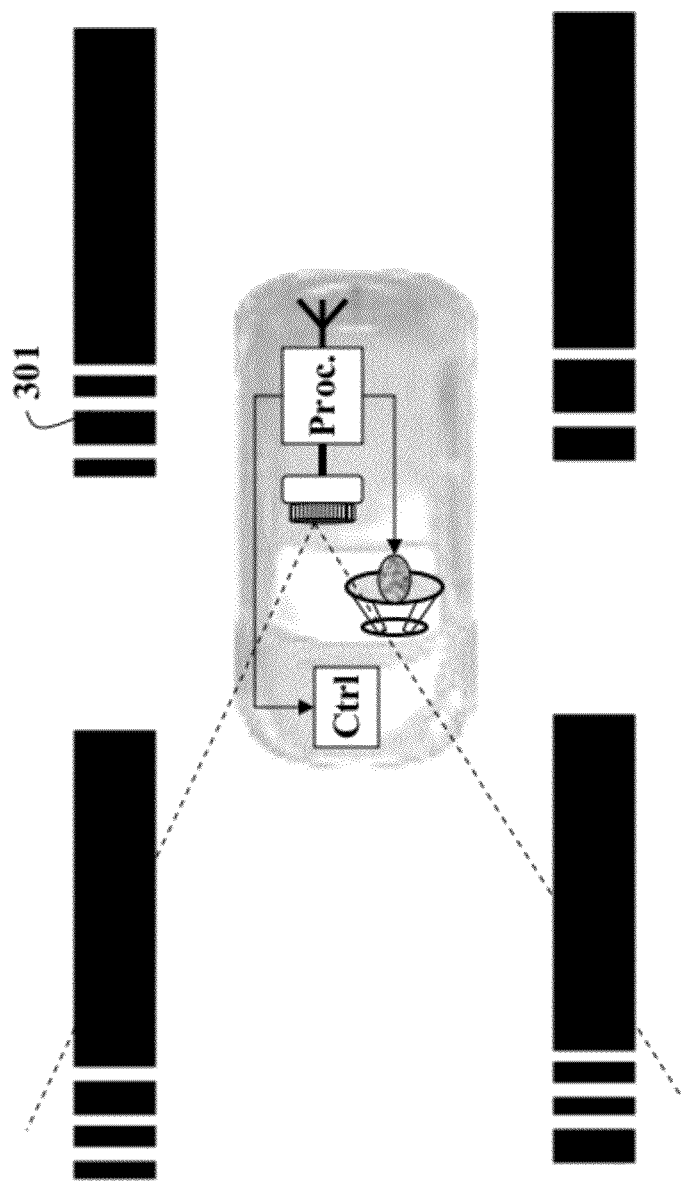
FIG. 3 is a schematic of encoded digital information using one-dimensional bar codes according to embodiments of the invention.

FIG. 3 shows a one-dimensional bar code 301.

Figure 4:
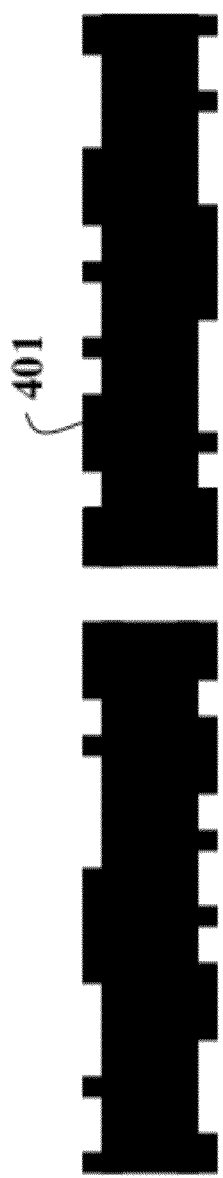
FIG. 4 is a schematic of encoded digital information using varying widths according to embodiments of the invention.

FIG. 4 shows lane markings 401 that vary the width. This is similar to the two-dimensional matrix code, except that the code is only applied at the edge.

Figure 5:
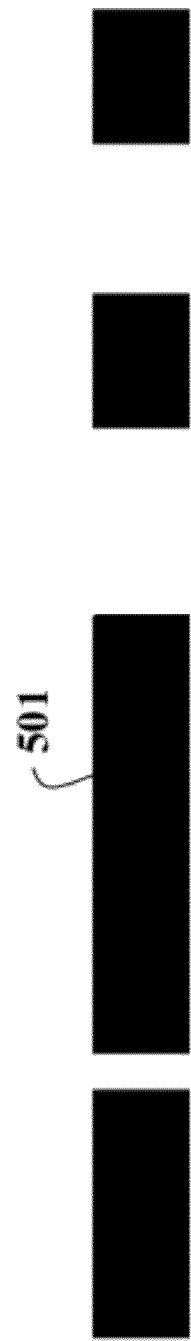
FIG. 5 is a schematic of encoded digital information using varying lengths and gaps.

FIG. 5 shows lane markings 501 by varying the lengths and gaps between the markings.

It should be understood that markings described above can be combined in various forms.

All the above digital patterns are also applied using a near infrared reflector paint and material as well as other paints and materials that have different emissivity that make them distinguishable in a thermal infrared camera. Using different colors in a lane marking is another way of including the digital information.

APPLICATIONS

The digital information can encode road curvature, points of interest, speed restrictions, upcoming hazards, exit numbers, and cross road names. Road curvature and speed information can help vehicle to control steering and speed to achieve lane keeping support functionality.

Special digital information can be added to temporary lanes during road construction. Another application embeds location information, including geospatial coordinates, longitude, latitude, relative position and other coordinate system information, using the digital codes within the lane markings. Such an enhanced lane marking gives location information to the vehicle without depending on a GPS system.

Figure 6:
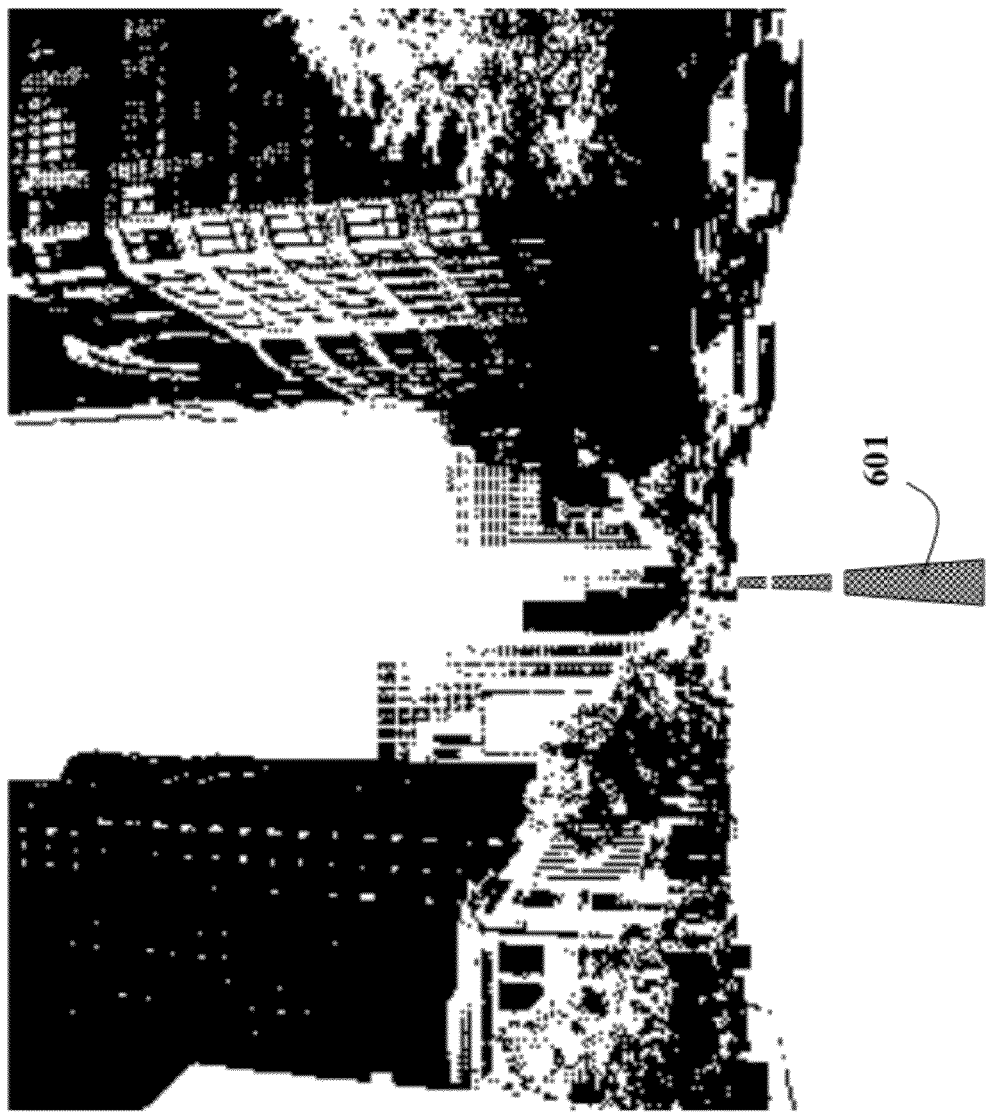
FIG. 6 is a schematic of encoded digital information using two-dimensional matrices in an urban environment according to embodiments of the invention.

As an advantage, the lane markings 601 can store positional information that can be decoded inside tunnels, or urban canyons as shown in FIG. 6, where conventional positioning systems, such GPS, fail.

We claim:

1. A method for coding digital information stored in a road surface, comprising a processor for performing steps of the method, comprising the steps of:

acquiring images of a road surface using an optical sensor, wherein the road surface includes lane markings, and wherein the lane markings store encoded digital information;

decoding the digital information from the images to produce decoded digital information;

analyzing the decoded digital information; and generating a feedback signal according to the decoded digital information.

2. The method of claim 1, wherein the optical sensor is sensitive to visible light, and, the digital information is observable in the visible light spectrum.

3. The method of claim 1, wherein the optical sensor is sensitive to infrared light, and the digital information is observable in the infrared light spectrum.

4. The method of claim 1, wherein the road surface is a read/write memory for storing the encoded digital information.

5. The method of claim 1, wherein the road markings include an error correcting code.

6. The method of claim 1, wherein the encoded digital information is in a form of a two-dimensional matrix.

7. The method of claim 1, wherein the encoded digital information uses a QR code.

8. The method of claim 1, wherein the encoded digital information stores Uniform Resource Locators.

9. The method of claim 1, wherein the digital information encodes positional information.

10. The method of claim 7, wherein the encoded digital information appear as characters.

11. The method of claim 1, wherein the encoded digital information uses a PDF417 code.

12. The method of claim 1, wherein the encoded digital information includes white and black modules, and a ratio of white to black modules is at least 2 to 1.

13. The method of claim 1, wherein the encoded digital information uses Bott's dots.

14. The method of claim 1, wherein the encoded digital information is a one-dimensional bar code 301.

15. The method of claim 1, wherein the encoded digital information uses varying width lane markings.

16. The method of claim 1, wherein the encoded digital information uses varying length and gaps of the markings.

17. The method of claim 1, wherein the digital information is used to enable lane keeping support functionality.

18. The method of claim 1, wherein the camera is sensitive to the heat radiation, and the digital information is observable in the far infrared (thermal) spectrum.

19. A system for coding digital information stored in a road surface, comprising a processor for performing steps of the method, comprising the steps of:

an optical sensor configured to acquiring images of the road surface using an optical sensor, wherein the road surface includes lane markings, and wherein the lane markings store encoded digital information;

a decoder configured to decode the digital information from the images to produce decoded digital information;

an analyzer configured to analyze the decoded digital information; and means for generating a feedback signal according to the decoded digital information.

* * * * *